UNITED STATES PATENT OFFICE 2,591,634

PROCESS FOR THE PREPARATION OF RAPIDLY HARDENING CAST RESINS FROM PHENOL AND FORMALDEHYDE AND TENSION-FREE CASTINGS PREPARED THEREFROM

Willem Johan Taat and Rudolf Willem van Hoesen Korndorffer, Delft, Netherlands, assignors to Nederlandse Organisatie voor Toegepast-Natuurwetenschappelijk Onderzoek, ten behoeve van Nijverheid, Handel en Verkeer, The Hauge, Netherlands, a corporation of the Netherlands No Drawing. Application February 9, 1949, Serial No. 75,492. In the Netherlands February 16, 1948

14 Claims. (Cl. 260—59)

The present invention relates to a process for the preparation of rapidly hardening cast resins from phenol and formaldehyde and to the castings, free from tension, prepared from these cast resins.

It is well known, that cast resins based upon phenol and formaldehyde give tension-free products upon slow and careful hardening. As such a slow hardening entails difficulties in practice, means to cause hardening to proceed more quickly have been searched after. Thus it has been proposed to accelerate hardening by working at higher temperatures and under increased pressure. In general, however, products, which still show considerable tension, are obtained in this way. In order to eliminate these tensions substances, such as glycerol, have been added, or the product was prepared in an inert atmosphere. The results thus obtained, however, did not show much improvement.

Also various acids, such as hydrochloric acid, chloroacetic acid and lactic acid, have been used as catalysts for the acceleration of the hardening of cast resins, based upon phenol and formaldehyde. Cast resins provided with these catalysts, however, are not suitable for the production of castings, inasmuch as after some time tears and ruptures appear in said objects and empty spaces are formed even to such an extent, that articles of a certain dimension fall apart, in grains.

It has now been found, that rapidly hardening cast resins from phenol and formaldehyde suitable for the preparation of tension-free castings may be prepared, if dioxides of metalloids from the sixth group of the periodic system, such as sulfur and selenium, are added to a cast resin mass previously condensed in alcaline medium.

The addition of the dioxides according to the present invention not only shortens the hardening time of the resins from phenol and formaldehyde to a considerable extent, but also permits the production of castings, which are completely free from tension. The machinability is also very satisfactory. A striking feature of machining on a lathe or in a boring machine is that the chips do not consist, such as is usual in the case of cast resins, of splinters, but that a more coherent turning may be obtained, such as is the case with metals. The outward appearance of the hardened castings is very smooth and glossy. The colour varies, according to the percentage of catalyst added, from pale yellow to dark brown. The castings have unlimited durability without tearing.

Dependent upon the extent of the acceleration of hardening, which it is desired to reach, or upon the desired colour or toughness of the cured castings the amounts of the dioxides to be added may vary. Good results were obtained with amounts varying from 10 to 20%.

The addition of the catalysts may be carried out in various manners. An aqueous or a completely anhydrous resin may be used as a starting material. In the former as well as in the latter case the dioxide may be introduced in gaseous condition. One may also add a solution of one of the dioxide in water or in a water miscible liquid to the resins which still contain some water. In this latter method exact dosing is easier than in the former method. The water or the water miscible liquid is then evaporated in vacuum at a low temperature, together with the water from the resin.

Particularly good results were obtained with selenium dioxide. Upon the addition of an aqueous solution of selenium dioxide to a not completely dehydrated resin the resin syrup may be completely dehydrated at about 50° C. at a pressure of about 25 mm. and the residue may be casted and hardened at 80° C.

A completely dehydrated resin was also used to advantage, in which the water may be removed in vacuum at a higher temperature than in a resin, to which an aqueous solution of selenium dioxide has been added. To said resin a solution of selenium dioxide in glycerol is then added, preferably a mixture of equal parts, after which the products may be casted and hardened at 80° C. The latter method has the advantage, that it is possible to store the resin syrup during a rather long period and to provide it with the catalyst consisting of a solution of selenium dioxide in glycerol only just before casting.

Example I 48 parts of phenol, 105 parts of 33% formalin, 25 parts denatured 96% ethanol and 0.75 parts of sodium hydroxide were mixed and heated for three quarters of an hour. The reaction mixture was then acidified with a mixture of 1.4 parts of monochloro acetic acid and 1 part of 50% lactic acid to a pH of about 4. This acidification is necessary in order to permit the water to be properly evaporated from the resin in vacuum at a higher temperature. After the water has been distilled off, the yellowish viscous syrup may be stored without objection during a rather long period. It hardens in porcelain moulds at about 80° C. in 48 hours.

At an elevated temperature sulfur dioxide is led into said resin, until the colour has changed from yellow into green. It is then poured into moulds at about 80° C. and hardened at 80° C. for 1 hour. In this way beautiful shaped pieces are obtained.

Example II

The phenol-formaldehyde resin obtained according to Example I was partially freed of water. To this incompletely dehydrated resin there was added an aqueous solution of selenium dioxide. The resin syrup was then further free of water in vacuum at 50° C., until it stopped producing a distillate. The syrup was poured in sheet form and hardened at 80° C. Dynstat blocks were then sawed out for the determination of the mechanic properties.

In the following table the results are listed.

| Per cent selenium dioxide | Curing time in hours | Flexural strength kg./cm.² (Dynstat) | Impact strength kg. cm./cm.² (Dynstat) |
| --- | --- | --- | --- |
| 10 | 1.5 | 690 | 5.7 |
| 10 | 2.0 | 826 | 15.0 |
| 10 | 2.5 | 974 | 20.0 |
| 10 | 3.0 | 770 | 13.0 |
| 15 | 0.75 | 670 | 9.3 |
| 15 | 1.0 | 645 | 9.0 |
| 15 | 1.5 | 910 | 14.0 |
| 15 | 2.0 | 787 | 8.2 |

The castings thus obtained are completely free from tension.

Example III

The phenol-formaldehyde resin prepared according to Example I was completely dehydrated in vacuum at an elevated temperature. 80 parts thereof were then mixed, just prior to casting, with 20 parts of a mixture of equal parts of glycerol and selenium dioxide. Both this mixing and the following casting and hardening was carried out at 80° C. The bending strength and the shock resistance were determined on experimental blocks, as in Example II. The results are listed in the following table.

| Per cent selenium dioxide | Curing time in hours | Flexural strength kg./cm.² (Dynstat) | Impact strength kg. cm./cm.² (Dynstat) |
| --- | --- | --- | --- |
| 10 | 4 | 630 | 16 |
| 10 | 5 | 978 | 12 |
| 10 | 6 | 1,058 | 12 |
| 10 | 20 | 1,155 | 18 |

The outward appearance and the machinability of the products obtained are equal to those of the products obtained according to Example II. The products are completely free from tension and even after storage for months do not show any tendency to tear or crack.

We claim:

1. A process of making cast resins which comprises hardening a phenol-formaldehyde reaction product in the presence of a small amount of selenium dioxide; and recovering a cast resin therefrom.

2. A process of making cast resins which comprises hardening a phenol-formaldehyde reaction product in the presence of 10-20% of selenium dioxide; and recovering a cast resin therefrom.

3. A process for the manufacture of rapidly hardening cast resins, which comprises reacting phenol and formaldehyde in an alkaline medium to form a resinous solution; at least partially dehydrating said resinous solution; adding thereto a minor amount of selenium dioxide; and hardening the resultant mixture of phenol-formaldehyde reaction product and selenium dioxide to form a cast resin.

4. A process for the manufacture of rapidly hardening cast resins, which comprises reacting phenol and formaldehyde in an alkaline medium to form a resinous solution; at least partially dehydrating said resinous solution; adding thereto 10-20% of selenium dioxide; and hardening the resultant mixture of phenol-formaldehyde reaction product and selenium dioxide to form a cast resin.

5. A process according to claim 3 wherein the selenium dioxide is added dissolved in a solvent.

6. A process according to claim 5 wherein the solvent is glycerol.

7. A process according to claim 6 in which the solution of selenium dioxide in glycerol has a concentration of about 50%.

8. A method of preparing tension free castings, which comprises reacting phenol and formaldehyde in an alkaline medium to form a resinous solution, at least partially deyhdrating said resinous solution, adding thereto a minor amount of selenium dioxide, hardening the resultant mixture of phenol-formaldehyde reaction product and selenium dioxide in a mold, and recovering tension free castings therefrom.

9. A rapidly hardening cast resin consisting essentially of a phenol-formaldehyde reaction product and a minor amount of selenium dioxide.

10. A rapidly hardening cast resin consisting essentially of a phenol-formaldehyde reaction product and about 10-20% selenium dioxide.

11. A long-lasting, tension-free casting comprising a molded, hardened phenol-formaldehyde reaction product containing a small amount of selenium dioxide.

12. A long-lasting, tension-free casting comprising a molded, hardened phenol-formaldehyde reaction product containing about 10-20% selenium dioxide.

13. A process of making a tension-free, long-lasting casting which comprises molding a phenol-formaldehyde reaction product containing a small amount of selenium dioxide whereby the product is hardened, and recovering a hardened casting therefrom.

14. A process of making a tension-free, long-lasting casting which comprises molding a rapidly hardening cast resin consisting essentially of a phenol-formaldehyde reaction product and about 10-20% selenium dioxide, and recovering a molded casting therefrom.

WILLEM JOHAN TAAT.
RUDOLF WILLEM van
      HOESEN KORNDORFFER.

REFERENCES CITED

The following references are of record in the file of this patent:

UNITED STATES PATENTS

| Number | Name | Date |
| --- | --- | --- |
| Re. 19,708 | Ostersetzer et al. | Sept. 17, 1935 |
| 1,909,786 | Pantke | May 16, 1933 |
| 2,410,395 | Smidth | Oct. 29, 1946 |

FOREIGN PATENTS

| Number | Country | Date |
| --- | --- | --- |
| 9,390 | Great Britain | 1914 |
| 129,993 | Great Britain | July 16, 1919 |